(12) United States Patent
Tsujita

(10) Patent No.: US 10,401,708 B2
(45) Date of Patent: Sep. 3, 2019

(54) ADAPTER DEVICE AND IMAGING APPARATUS

(71) Applicant: SONY CORPORATION, Tokyo (JP)

(72) Inventor: Shigeru Tsujita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/769,156

(22) PCT Filed: Sep. 2, 2016

(86) PCT No.: PCT/JP2016/075866
§ 371 (c)(1),
(2) Date: Apr. 18, 2018

(87) PCT Pub. No.: WO2017/081914
PCT Pub. Date: May 18, 2017

(65) Prior Publication Data
US 2018/0299749 A1    Oct. 18, 2018

(30) Foreign Application Priority Data

Nov. 10, 2015    (JP) .................................. 2015-220401

(51) Int. Cl.
*G03B 17/02*        (2006.01)
*G03B 17/14*        (2006.01)
(Continued)

(52) U.S. Cl.
CPC ............. *G03B 17/14* (2013.01); *G03B 17/02* (2013.01); *G03B 17/56* (2013.01); *H04N 5/225* (2013.01);
(Continued)

(58) Field of Classification Search
CPC ...................................................... G03B 17/56
(Continued)

(56) References Cited

U.S. PATENT DOCUMENTS

2006/0233545 A1* 10/2006 Senba ..................... G03B 17/14
396/529
2012/0275025 A1* 11/2012 Parrill .................... G02B 23/16
359/511

(Continued)

FOREIGN PATENT DOCUMENTS

CN       103327218 A    9/2013
CN       105637853 A    6/2016
(Continued)

OTHER PUBLICATIONS

International Search Report and Written Opinion of PCT Application No. PCT/JP2016/075866, dated Nov. 22, 2016, 15 pages of ISRWO.

*Primary Examiner* — Clayton E. LaBalle
*Assistant Examiner* — Kevin C Butler
(74) *Attorney, Agent, or Firm* — Chip Law Group

(57) ABSTRACT

An adapter device according to the present disclosure includes: a mount section that is attached to any one of a plurality of main body mount sections included in a main body apparatus; and a user interface a state of which is switched in accordance with whether to which one of the plurality of main body mount sections the mount section has been attached. With this configuration, it is possible to attach to any one of a plurality of main body mount sections included in a main body apparatus, and the state of a user interface can be switched in accordance with whether which one of the main body mount sections has been attached with.

16 Claims, 12 Drawing Sheets

(51) Int. Cl.
  *G03B 17/30* (2006.01)
  *G03B 17/56* (2006.01)
  *G03B 19/04* (2006.01)
  *H04N 5/225* (2006.01)

(52) U.S. Cl.
  CPC ......... *H04N 5/2252* (2013.01); *H04N 5/2253* (2013.01); *H04N 5/2254* (2013.01); *G03B 17/30* (2013.01); *G03B 19/04* (2013.01); *G03B 2217/002* (2013.01)

(58) Field of Classification Search
  USPC .......................................................... 396/535
  See application file for complete search history.

(56) References Cited

U.S. PATENT DOCUMENTS

| | | | | |
|---|---|---|---|---|
| 2013/0229395 A1* | 9/2013 | Mills | ...................... | H04N 5/367 345/207 |
| 2016/0198093 A1* | 7/2016 | Ito | ...................... | H04N 5/23245 348/333.02 |

FOREIGN PATENT DOCUMENTS

| | | | | |
|---|---|---|---|---|
| EP | 2635031 A2 | 9/2013 | | |
| EP | 3038343 A1 | 6/2016 | | |
| JP | 02-082173 U | 6/1990 | | |
| JP | 06-119106 A | 4/1994 | | |
| JP | 07-064717 A | 3/1995 | | |
| JP | 10-124255 A | 5/1998 | | |
| JP | 2001-188292 A | 7/2001 | | |
| JP | 2002-073274 A | 3/2002 | | |
| JP | 2005-267429 A | 9/2005 | | |
| JP | 2006-295838 A | 10/2006 | | |
| JP | 2007194951 | * | 2/2007 | ............. H04N 5/225 |
| JP | 2007-194951 A | 8/2007 | | |
| JP | 2007-312297 A | 11/2007 | | |
| JP | 2007312297 | * | 11/2007 | ............... G02B 7/02 |
| JP | 2015-510372 A | 4/2015 | | |
| KR | 10-2013-0100757 A | 9/2013 | | |
| TW | 201342908 A | 10/2013 | | |
| WO | 2012/149206 A2 | 11/2012 | | |
| WO | 2013/130405 A1 | 9/2013 | | |
| WO | 2015/052974 A1 | 4/2015 | | |

* cited by examiner

ADAPTER DEVICE AND IMAGING APPARATUS

CROSS REFERENCE TO RELATED APPLICATIONS

This application is a U.S. National Phase of International Patent Application No. PCT/JP2016/075866 filed on Sep. 2, 2016, which claims priority benefit of Japanese Patent Application No. JP 2015-220401 filed in the Japan Patent Office on Nov. 10, 2015. Each of the above-referenced applications is hereby incorporated herein by reference in its entirety.

TECHNICAL FIELD

The present disclosure relates to an adapter device and an imaging apparatus.

BACKGROUND ART

Up to now, for example, Patent Literature 1 mentioned below has described a handy camera in which a connector to connect a camera main body and a grip is disposed on each of a right side and a left side so that the grip can be attached to any one of the right side and the left side of the front of the camera main body.

Moreover, Patent Literature 2 mentioned below has described, in a lens-interchangeable camera, to provide a camera in which even either a right-handed user or a left-handed user has the equivalent operativity without adding excessive accessories and hindering miniaturization.

CITATION LIST

Patent Literature

Patent Literature 1: JP H2-82173U
Patent Literature 2: JP 2007-194951A

DISCLOSURE OF INVENTION

Technical Problem

However, in the technique described in the above-described Patent Literature 1, since a grip section cannot be divided, a grip dedicated for a right hand and a grip dedicated for a left hand are needed. Moreover, since the configuration needs a plurality of connecting sections to attach the grip section to the camera main body, miniaturization becomes difficult. Furthermore, since it is necessary to attach the grip section to the camera main body, in the case of attaching a device such as a video light to the grip section, there is a problem that there are many physical restrictions.

Moreover, in the technique described in the above-described Patent Literature 2, since a grip section cannot be divided, there is a problem that it is necessary on a camera main body to determine the processing for a left hand or a right hand.

Then, it has been desired that it is possible to attach to any one of a plurality of main body mount sections included in a main body apparatus, and that the state of a user interface is switched in accordance with whether which one of the main body mount sections has been attached with.

Solution to Problem

According to the present disclosure, there is provided an adapter device including: a mount section that is attached to any one of a plurality of main body mount sections included in a main body apparatus; and a user interface a state of which is switched in accordance with whether to which one of the plurality of main body mount sections the mount section has been attached.

In addition, according to the present disclosure, there is provided an imaging apparatus including: a main body section that includes a plurality of main body mount sections; and an adapter device that includes a mount section that is attached to any one of the plurality of main body mount sections included in the main body section, and a user interface a function of which is switched in accordance with whether to which one of the plurality of main body mount sections the mount section has been attached.

In addition, according to the present disclosure, there is provided an adapter device that is operated with a right hand or a left hand of a user, including: a first mount section that is attached to a right-hand mount section included in a main body apparatus and including one of a male mold and a female mold, and that includes the other one of the male mold and the female mold; and a second mount section that is attached to a left-hand mount section included in the main body apparatus and including one of a male mold and a female mold, and that includes the other one of the male mold and the female mold.

Advantageous Effects of Invention

As has described in the above, according to the present disclosure, it is possible to attach to any one of a plurality of main body mount sections included in a main body apparatus, and the state of a user interface can be switched in accordance with whether which one of the main body mount sections has been attached with.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
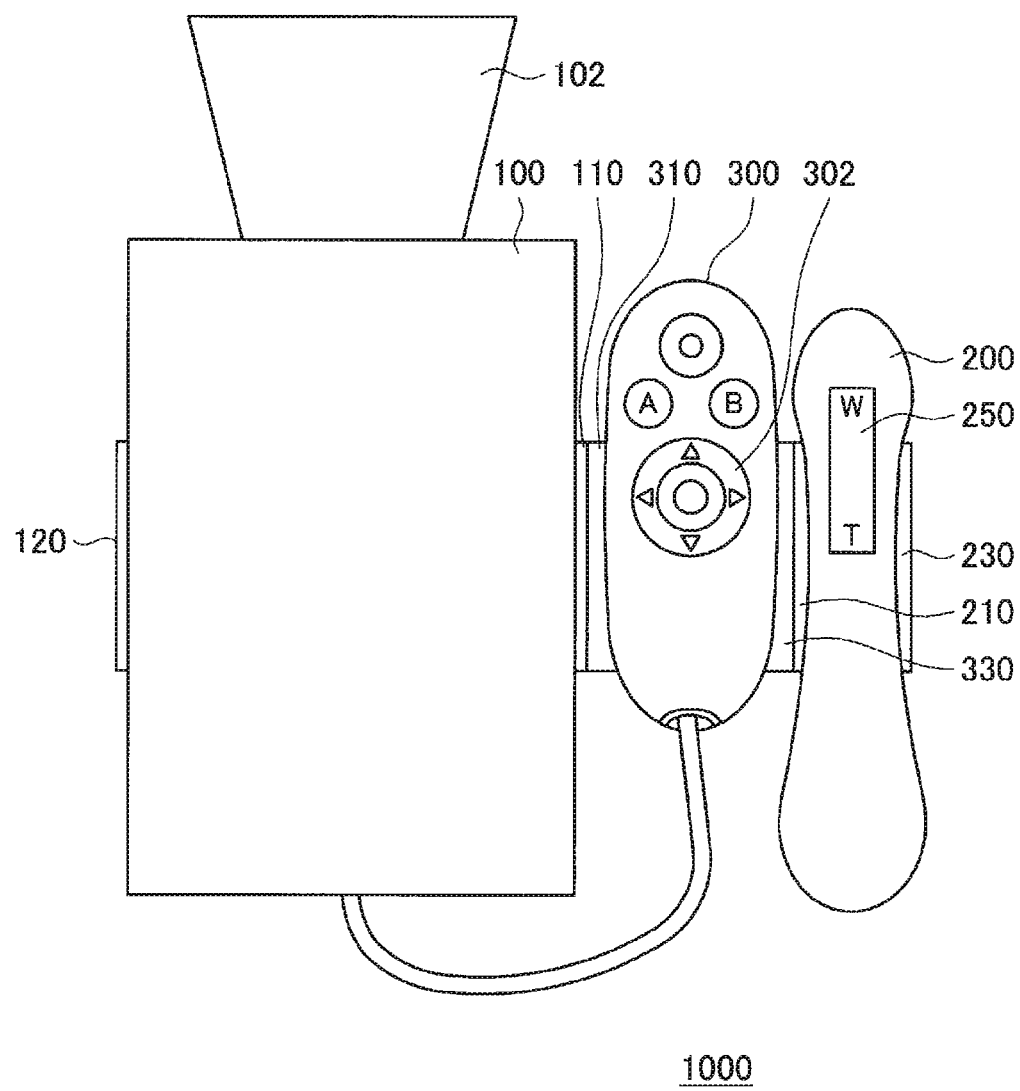
FIG. 1 is a schematic diagram showing a state where an imaging apparatus is viewed from an upper portion.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

It should be noted that the description will be given in the following order.

1. Appearance example of imaging apparatus
2. Configuration example of grip section, cross key section, and main body section
3. Configuration example of cross key section
4. Configuration example of grip section
5. Configuration example of display section

[1. Appearance Example of Imaging Apparatus]

First, with reference to FIG. 1, the schematic configuration of an imaging apparatus 1000 according to one embodiment of the present disclosure is described. FIG. 1 is a schematic diagram showing a state where the imaging apparatus 1000 is viewed from an upper portion. As shown in FIG. 1, the imaging apparatus 1000 includes a main body section (main body apparatus) 100, a grip section 200, and a cross key section 300.

On the main body section 100, a lens section 102 to image an object to be imaged is disposed. The grip section 200 is attached to the main body section 100 via the cross key section 300. More specifically, the cross key section 300 is attached to the main body section 100, and the grip section 200 is attached to the cross key section 300 having been attached to the main body section 100.

When a photographer (user) holds the imaging apparatus 1000, the grip section 200 is a grip for being held by a single hand. In the present embodiment, the cross key section 300 is configured to be detachably attached to the main body section 100, and the grip section 200 is configured to be detachably attached to the cross key section 300. Furthermore, in the present embodiment, the grip section 200 and the cross key section 300 can be attached to any one of a position for a right hand and a position for a left hand. FIG. 1 shows a case where the grip section 200 and the cross key section 300 are attached to a position for a right hand, and the grip section 200 and the cross key section 300 are attached to the right side of the main body section 100.

As shown in FIG. 1, the grip section 200 is provided with a switch (rocker switch) 250 to operate the zooming of the lens section 102 of the main body section 100 in a direction to a telephoto end (T) or a wide end (W).

The cross key section 300 to be attached between the main body section 100 and the grip section 200 is equipped with a cross key 302 to input operation information in the case where a photographer holds the grip section 200.

Figure 2:
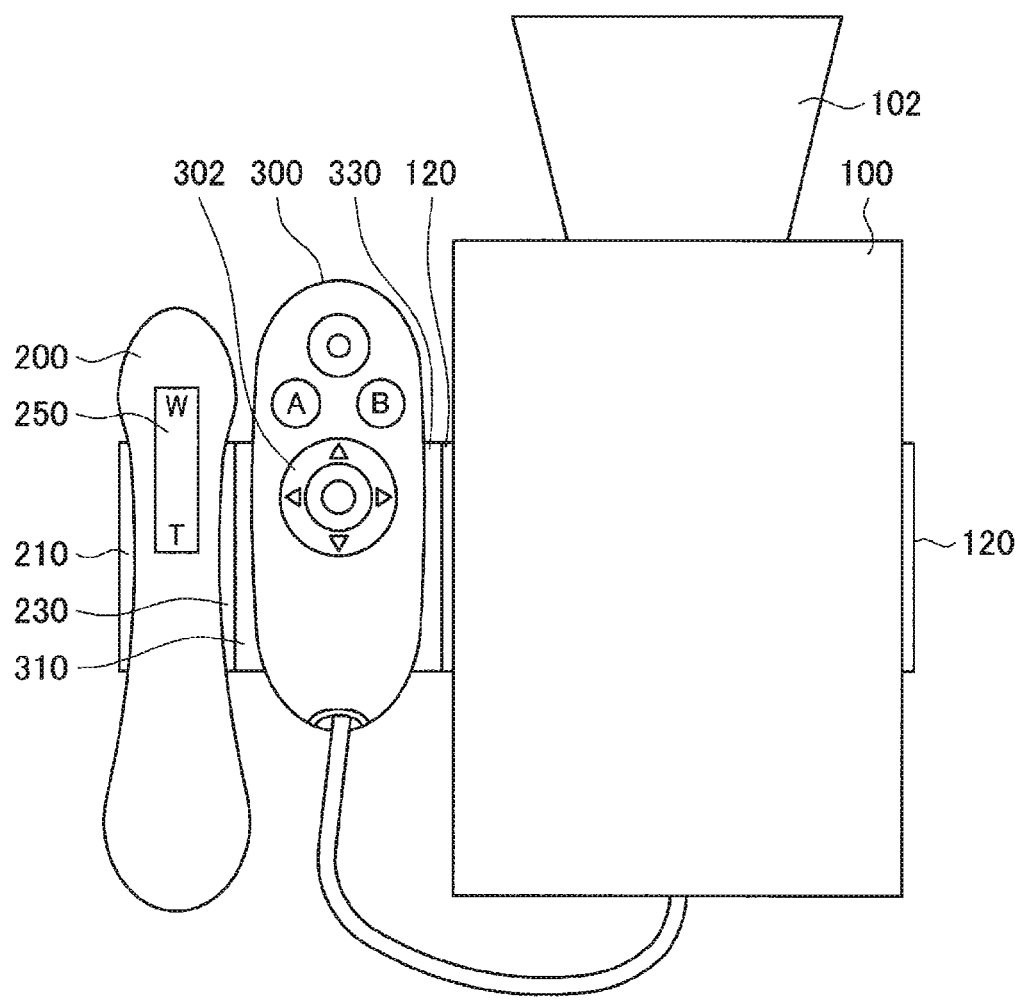
FIG. 2 is a schematic diagram showing a case where a grip section and a cross key section are attached to a position for a left hand.

FIG. 2 is a schematic diagram showing a case where the grip section 200 and the cross key section 300 are attached to a position for a left hand, and shows a state where the imaging apparatus 1000 is viewed from an upper portion. In this case, as shown in FIG. 2, the grip section 200 and the cross key section 300 are attached to the left side of the imaging apparatus 1000.

Figure 3:
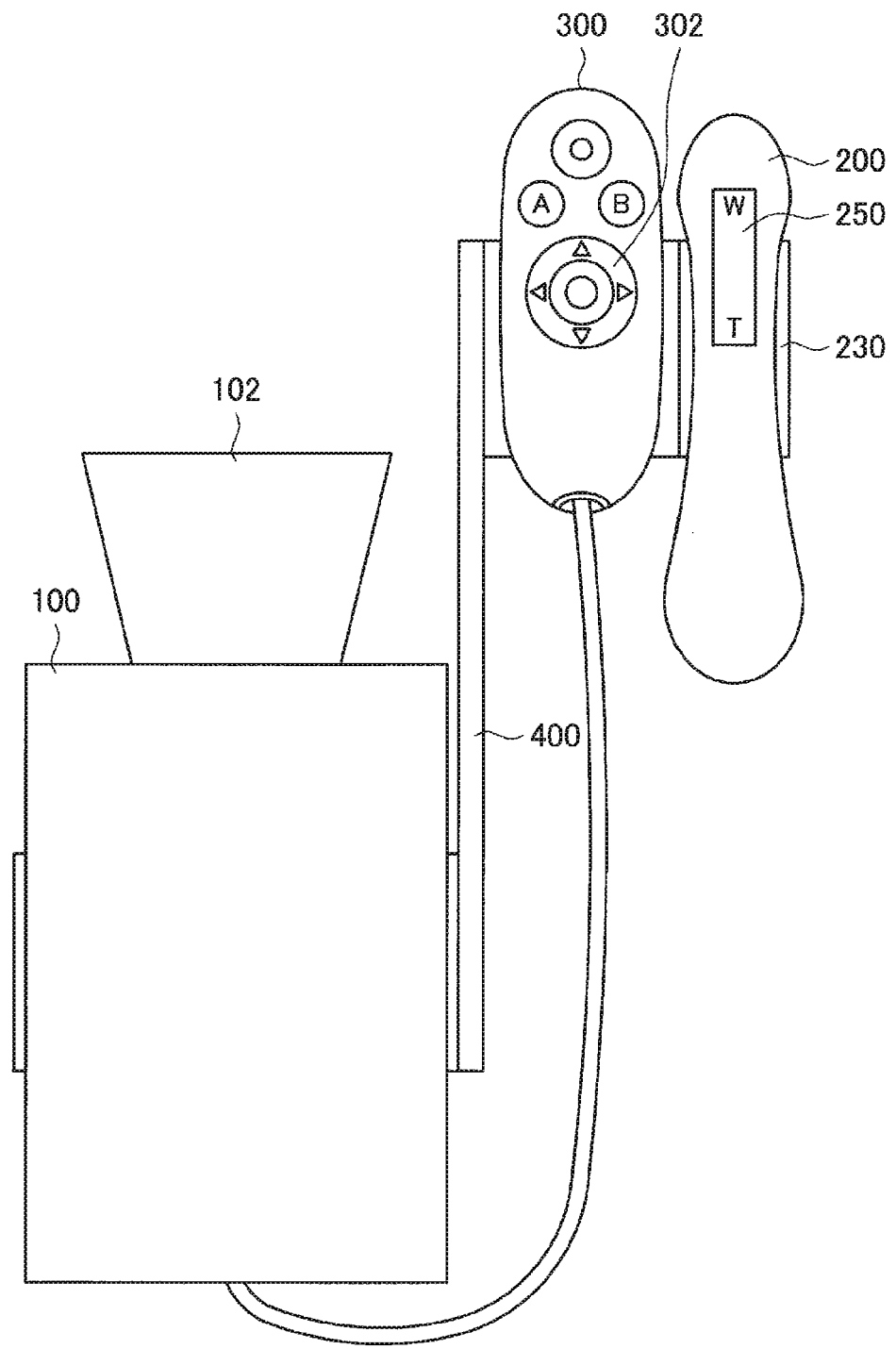
FIG. 3 is a schematic diagram showing a case where a grip section and a cross key section are attached to a position for a right hand via an adapter.
Figure 4:
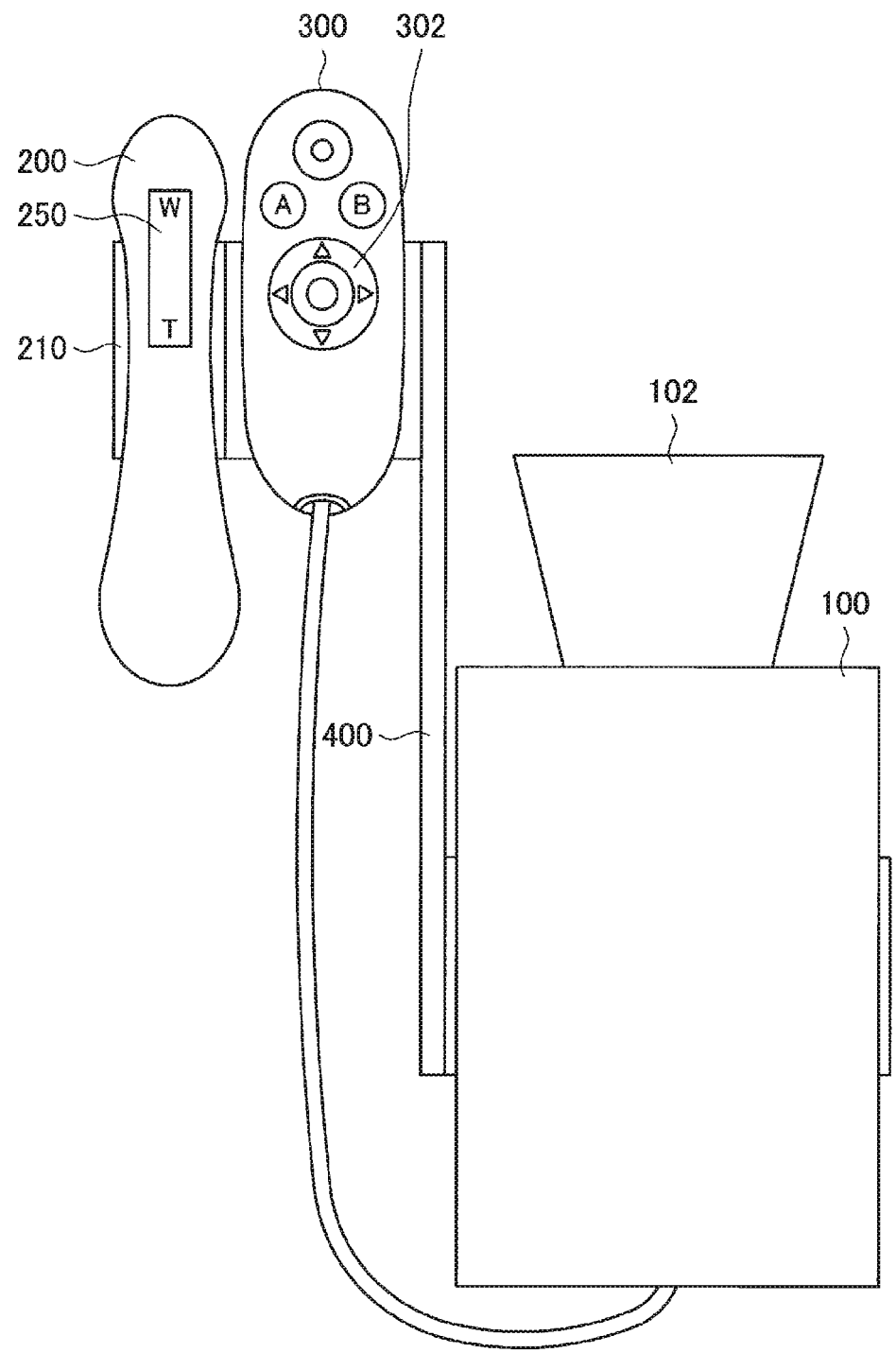
FIG. 4 is a schematic diagram showing a case where a grip section and a cross key section are attached to a position for a left hand via an adapter.

FIG. 3 is a schematic diagram showing a case where the grip section 200 and the cross key section 300 are attached to a position for a right hand, and shows an example where the main body section 100 and the cross key section 300 are linked via an adapter 400. Moreover, FIG. 4 is a schematic diagram showing a case where the grip section 200 and the cross key section 300 are attached to a position for a left hand, and shows an example where the main body section 100 and the cross key section 300 are linked via an adapter 400.

Figure 5:
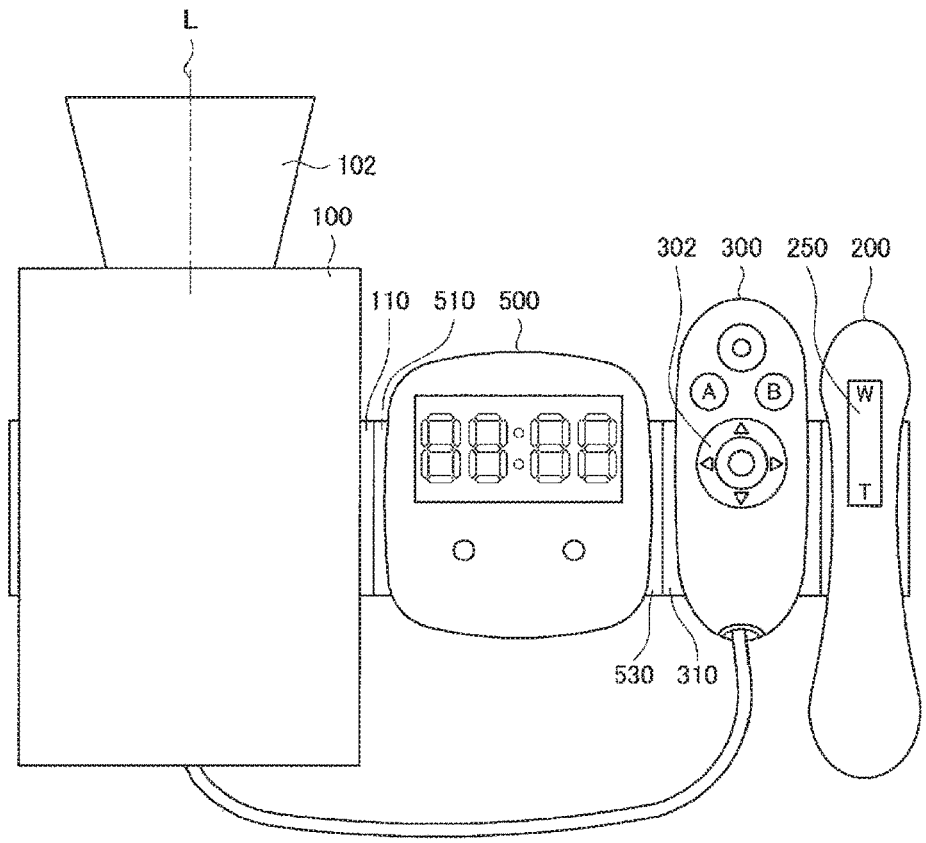
FIG. 5 is a schematic diagram showing an example where, in addition to a grip section and a cross key section, a display device is attached together.

FIG. 5 is a schematic diagram showing an example where, in addition to the grip section 200 and the cross key section 300, a display device 500 is attached together. The display device 500 includes a display section 510 including an LED, an LCD, etc., and displays information regarding photographing. The display device 500 may be configured in one body with the adapter 400 shown in FIG. 3 and FIG. 4.

[2. Configuration Example of Grip Section, Cross Key Section, and Main Body Section]

Figure 6A:
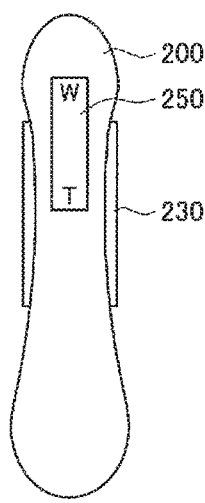
FIG. 6A is a schematic diagram showing a configuration of a grip section.
Figure 6B:
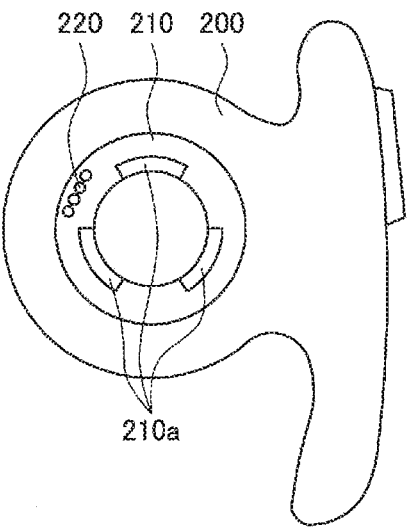
FIG. 6B is a schematic diagram showing a configuration of a grip section.
Figure 6C:
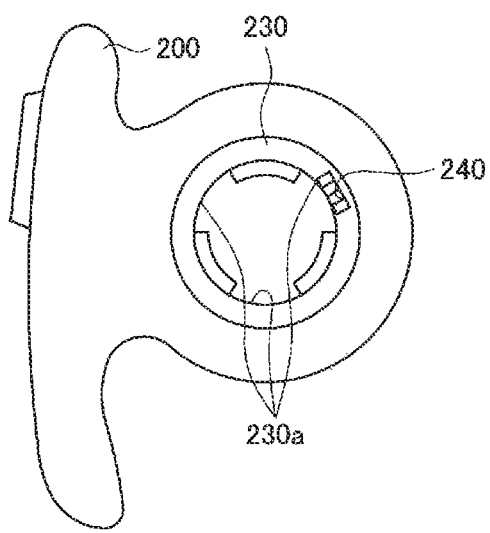
FIG. 6C is a schematic diagram showing a configuration of a grip section.

FIG. 6A, FIG. 6B, and FIG. 6C are a schematic diagram showing a configuration of the grip section 200. Here, FIG. 6A shows a front view of the grip section 200, FIG. 6B shows a left side view of the grip section 200, and FIG. 6C shows a right side view of the grip section 200.

The grip section 200 includes a left mount section 210 to link with another device and a left contact 220 to make electrical connection. Moreover, on a side opposite to the left mount section 210, there are provided a right mount section 230 to link with another device and a right contact 240 to make electrical connection. Moreover, the grip section 200 includes on its upper portion a switch 250 to be operated at the time of zooming operation and the like.

Figure 7A:
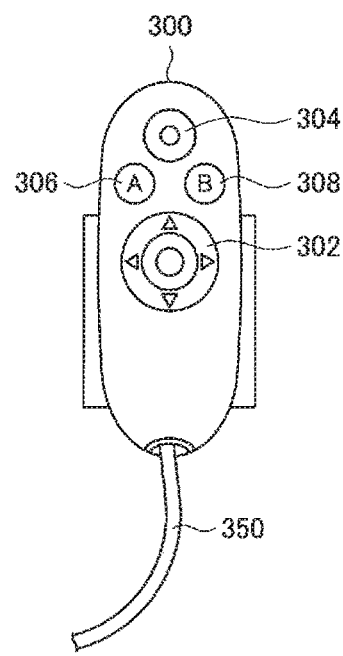
FIG. 7A is a schematic diagram showing a configuration of a cross key section.
Figure 7B:
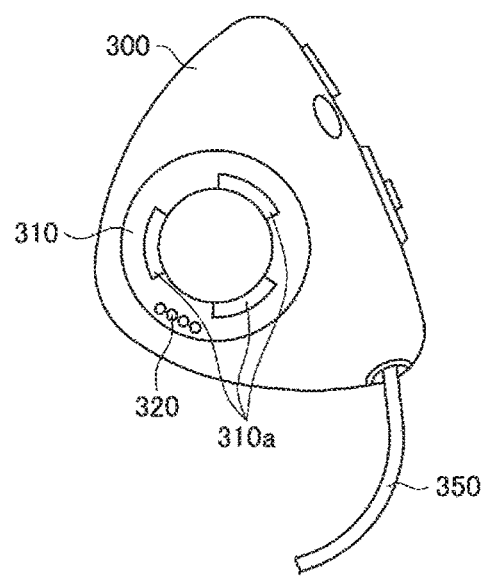
FIG. 7B is a schematic diagram showing a configuration of a cross key section.
Figure 7C:
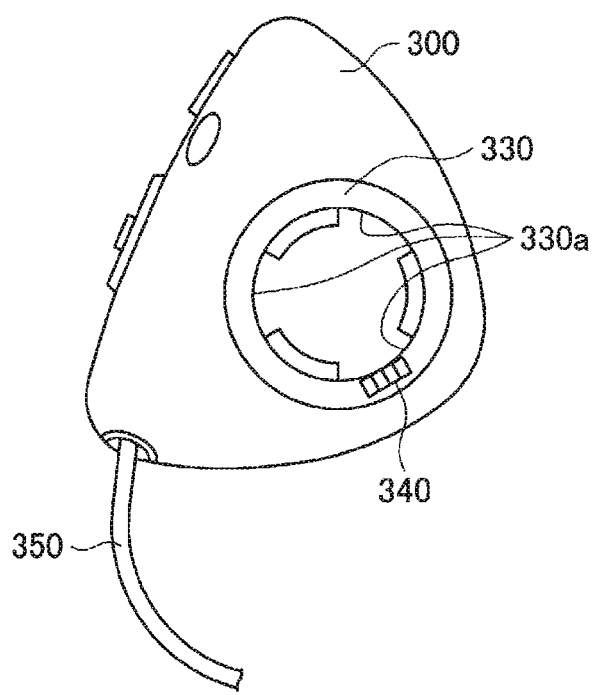
FIG. 7C is a schematic diagram showing a configuration of a cross key section.

FIG. 7A, FIG. 7B, and FIG. 7C are a schematic diagram showing a configuration of the cross key section 300. Here, FIG. 7A shows a front view of the cross key section 300, FIG. 7B shows a left side view of the cross key section 300, and FIG. 7C shows a right side view of the cross key section 300. The cross key section 300 includes a left mount section 310 to link with another device and a left contact 320 to make electrical connection. Moreover, on a side opposite to the left mount section 310, there are provided a right mount section 330 to link with another device and a right contact 340.

Moreover, the cross key section 300 includes a cross key 302, a REC key 304, a general-purpose key A 306, and a general-purpose key B 308. The cross key section 300 is configured to be connected with the main body section 100 through a cable 350, and to be able to notify the main body section 100 of the operation information of each of various keys.

As shown in FIG. 1, the main body section 100 includes a right mount section 110 and a left mount section 120 to link with another device. Moreover, the main body section 100 includes a right contact (not-illustrated) in the vicinity of the right mount section 110, and includes a left contact (not-illustrated) in the vicinity of the left mount section 120.

In a state shown in FIG. 1, the left mount section 210 of the grip section 200 is linked with the right mount section 330 of the cross key section 300, and the left contact 220 of the grip section 200 and the right contact 340 of the cross key section 300 are electrically connected. Moreover, in a state shown in FIG. 1, the left mount section 310 of the cross key section 300 is linked with the right mount section 110 of the main body section 100, and the left contact 320 of the cross key section 300 and the right contact of the main body section 100 are electrically connected.

Moreover, in a state shown in FIG. 2, the right mount section 230 of the grip section 200 is linked with the left mount section 310 of the cross key section 300, and the right contact 240 of the grip section 200 and the left contact 320 of the cross key section 300 are electrically connected. Moreover, in a state shown in FIG. 2, the right mount section 330 of the cross key section 300 is linked with the left mount section 120 of the main body section 100, and the right contact 340 of the cross key section 300 and the left contact of the main body section 100 are electrically connected.

As shown in FIG. 6B, the left mount section 210 of the grip section 200 includes claws 210*a* projecting outward, and is configured as a male mold. Moreover, as shown in FIG. 7C, the right mount section 330 of the cross key section 300 includes concave portions 330*a* into which the claws 210*a* of the left mount section 210 of the grip section 200 can be inserted, and is configured as a female mold. The left mount section 210 of the grip section 200 and the right mount section 330 of the cross key section 300 are configured to be rotated relatively in a state where the claws 210*a* have been inserted into the concave portions 330*a*, whereby the grip section 200 and the cross key section 300 are linked with each other with the similar principle as the mount of an interchangeable lens in a single-lens reflex camera.

Moreover, as shown in FIG. 7B, the left mount section 310 of the cross key section 300 includes claws 310*a* projecting outward, and is configured as a male mold. Moreover, as shown in FIG. 6C, the right mount section 230 of the grip section 200 includes concave portions 230*a* into which the claws 310*a* of the left mount section 310 of the cross key section 300 can be inserted, and is configured as a female mold. The right mount section 230 of the grip section 200 and the left mount section 310 of the cross key section 300 are linked with each other by being rotated relatively in a state where the claws 310*a* have been inserted into the concave portions 230*a*.

Moreover, the right mount section 110 of the main body section 100 is configured as a female mold similarly to the right mount section 230 of the grip section 200. Therefore, the right mount section 110 of the main body section 100 and the left mount section 310 of the cross key section 300 are linked with each other by being rotated relatively in a state where the claws 310*a* have been inserted in the concave portions of the right mount section 110.

Moreover, the left mount section 120 of the main body section 100 is configured as a male mold similarly to the left mount section 210 of the grip section 200. Therefore, the left mount section 120 of the main body section 100 and the right mount section 330 of the cross key section 300 are linked with each other by being rotated relatively in a state where the claws of the left mount section 120 have been inserted into the concave portions 330*a* of the right mount section 330 of the cross key section 300.

According to the above configuration, since both the left mount section 210 of the grip section 200 and the left mount section 310 of the cross key section 300 are the male molds, the both sections are configured to be unable to be linked with each other. Moreover, since both the right mount section 230 of the grip section 200 and the right mount section 330 of the cross key section 300 are the female molds, the both sections are configured to be unable to be linked with each other. Moreover, since both the right mount section 110 of the main body section 100 and the right mount section 330 of the cross key section 300 are the female molds, the both sections are configured to be unable to be linked with each other. Moreover, since both the left mount section 120 of the main body section 100 and the left mount section 310 of the cross key section 300 are the male molds, the both sections are configured to be unable to be linked with each other.

Therefore, if a user links the main body section 100 and the grip section 200 by disposing the cross key section 300 between the main body section 100 and the grip section 200, these sections become always a state shown in FIG. 1 or a state shown in FIG. 2, whereby it is possible to reliably prevent erroneous linkages performed by a user.

Moreover, in an example shown in FIG. 5, the left mount section 510 of the display device 500 and the right mount section 110 of the main body section 100 are linked with each other, and the right mount section 530 of the display device 500 and the left mount section 310 of the cross key section 300 are linked with each other.

The right mount section 110 of the main body section 100 is configured as a female mold, and the left mount section 510 of the display device 500 is configured as a male mold. Therefore, similarly to the above description, the right mount section 110 of the main body section 100 and the left mount section 510 of the display device 500 are linked with each other by being rotated relatively in a state where the claws of the left mount section 510 of the display device 500 have been inserted in the concave portions of the right mount section 110 of the main body section 100.

Moreover, the right mount section 530 of the display device 500 is configured as a female mold, and the left mount section 310 of the cross key section 300 is configured as a male mold. Therefore, similarly to the above description, the right mount section 530 of the display device 500 and the left mount section 310 of the cross key section 300 are linked with each other by being rotated relatively in a state where the claws 310*a* of the left mount section 310 of the cross key section 300 have been inserted in the concave portions of the right mount section 530 of the display device 500.

Also, in the case where the display device 500 is inserted between the main body section 100 and the cross key section 300 as shown in FIG. 5, if a user disposes the display device 500 between the main body section 100 and the cross key section 300, these sections and device become always an arrangement shown in FIG. 5 or a symmetrical arrangement about the optical axis L of the lens 102 serving as a center with respect to FIG. 5, whereby it is possible to reliably prevent erroneous linkages performed by a user.

[3. Block Configuration Example of Cross Key Section]

Figure 8:
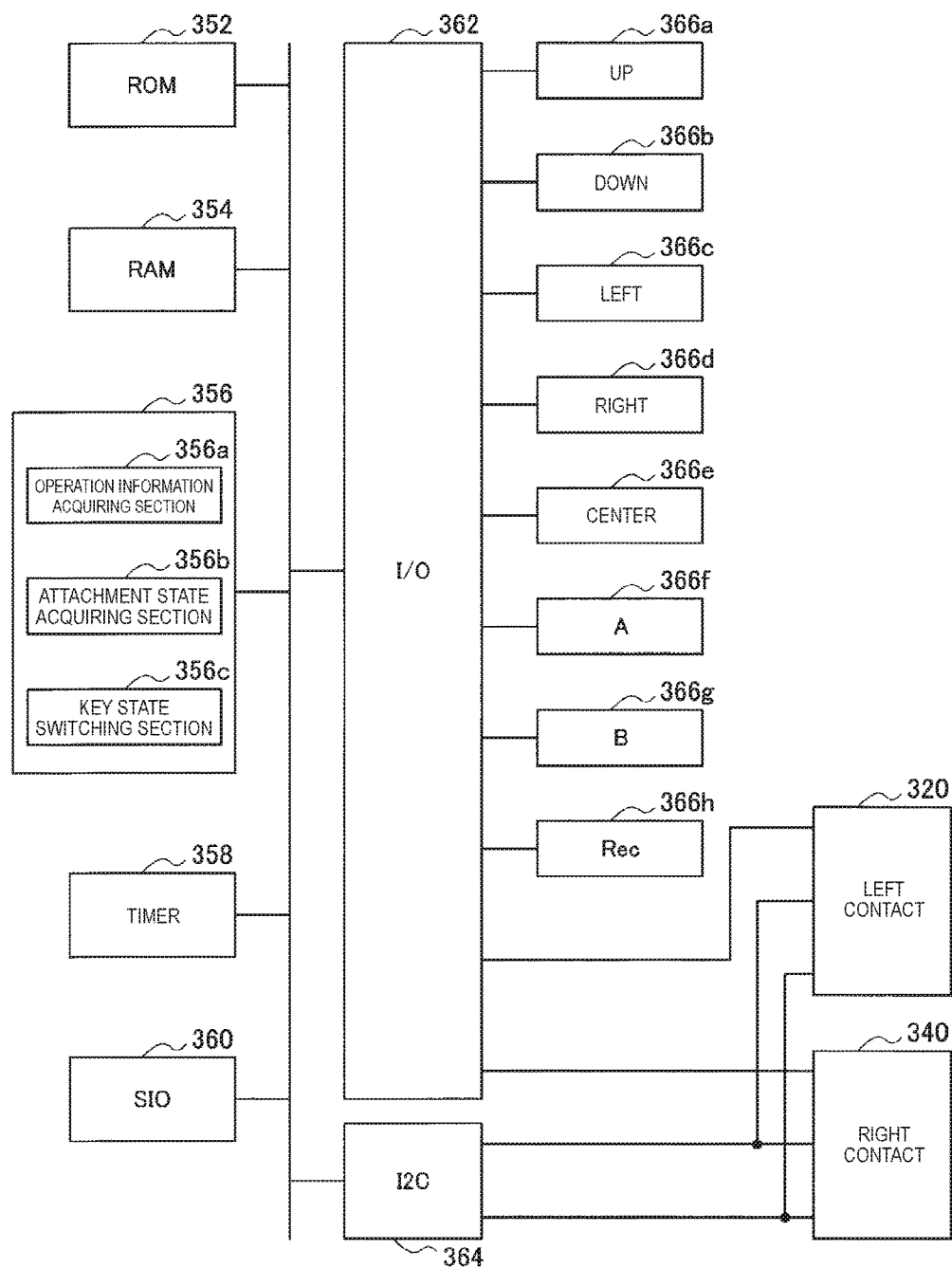
FIG. 8 is a schematic diagram showing a block configuration example of a cross key section.

FIG. 8 is a schematic diagram showing a block configuration example of the cross key section 300. As shown in FIG. 8, the cross key section 300 includes a ROM 352, a RAM 354, a CPU 356, a timer 358, a SIO (transmitting section) 360, a I/O controller 362, an I2C 364, keys 366*a* to 366*h*, a left contact 320, and a right contact 340.

To the CPU 356, connected are the timer 358 to generate timing for periodic processing; the SIO 360 to perform communication with the main body section 100; the I2C 364 to perform communication with other devices, such as the grip section 200; the I/O controller 362 to control the keys 366a to 366h and connection detection ports of other devices; the keys 366a to 366h to realize user operation; and the left contact 320 and right contact 340 to electrically connect with other devices.

The keys 366a to 366e are switches the states of which are switched correspondingly to operation for "up", "down", "left", "right" or "center" on the cross key 302. The key 366f and the key 366g correspond to the general-purpose key A 306 and the general-purpose key B 308 respectively, and are switches the states of which are switched correspondingly to operation for the general-purpose key A 306 and the general-purpose key B 308.

As shown in FIG. 1 through FIG. 4 and FIG. 7A, the general-purpose key A 306 and the general-purpose key B 308 are disposed left-right symmetrically on the top face of the cross key section 300. In the present embodiment, in accordance with whether the grip section 200 is linked to the right side of the cross key section 300 as shown in FIG. 1 or the grip section 200 is linked to the left side of the cross key section 300 as shown in FIG. 2, the role (state) of each of the general-purpose key A 306 and the general-purpose key B 308 being a user interface is made to be changed.

For example, in the state shown in FIG. 1, it is assumed that the functions of the general-purpose key A 306 and the general-purpose key B 308 are assigned as follows. In the case where a user presses the general-purpose key A 306 with an index finger, the main body section 100 becomes a standby state, and in the case where the user presses the general-purpose key B 308 with an index finger, the standby state is cancelled. In the state shown in FIG. 2, the respective functions of the general-purpose key A 306 and the general-purpose key B 308 are interchanged as follows. In the case where a user presses the general-purpose key B 308 by an index finger, the main body section 100 becomes a standby state, and in the case where a user presses the general-purpose key A 306 by an index finger, the standby state is cancelled. With this, an operation feeling in the case of operating with a right hand and an operation feeling in the case of operating with a left hand, can be made the same feeling.

Figure 9:
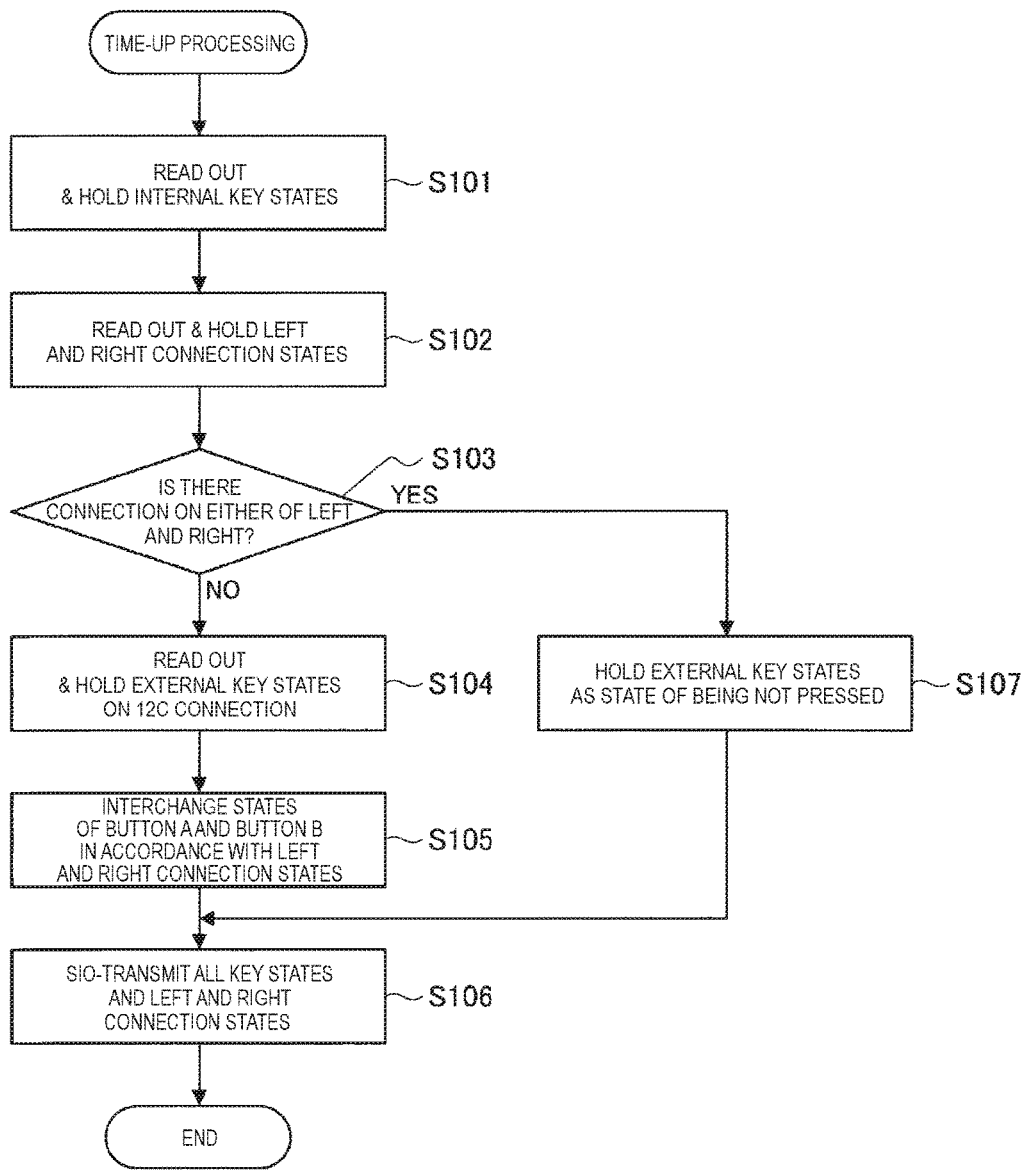
FIG. 9 is a flow chart showing time-up processing in a cross key section.

FIG. 9 is a flow chart showing time-up processing of the cross key section 300. The CPU 356 sets a prescribed time interval for the timer 358, and, upon receipt of the matter that the time has elapsed, executes time-up processing shown in FIG. 9.

First, upon starting the time-up processing, the CPU 356 reads out and holds the states of the internal keys 366a to 366h (Step S101). Next, the CPU 356 reads out and holds left and right connection states that show whether to either of the left and right of the main body section 100 is connected (Step S102). In this connection, the left and right connection states can be acquired by determining whether either of the left contact 320 and the right contact 340 is connected to the main body section 100. Moreover, the left and right connection states can be acquired in such a way that the CPU 356 performs communication with the main body section 100 through the left contact 320 and the right contact 340, and then, determines whether the communication with the main body section 100 can be performed through either of the left contact 320 and the right contact 340.

Next, with reference to the holding left and right connection states, it is confirmed whether another device is connected to the left contact 320 or the right contact 340 (Step S103), and in the case where another device is connected to the left contact 320 or the right contact 340, the external key states on I2C connection are read out and held (Step S104). In this connection, the read-out of the external key states will be mentioned later.

Next, in accordance with the holding left and right connection states, the CPU 356 interchanges the depression states of the key 366f and the key 366g corresponding to the general-purpose key A 306 and the general-purpose key B 308 respectively (Step S105). Successively, all the key states and the left and right connection states are SIO-transmitted (Step S106). At this time, the SIO 360 functions as a transmitting section.

Moreover, in the case where another device is not connected to the left contact 320 or the right contact 340 in Step S103, the external key states are held as a state of being not pressed (Step S107), and all the key states and the left and right connection states are SIO-transmitted to the main body section 100 (Step S106).

According to the above processing, in accordance with the left and right connection states of the cross key section 300, the respective functions assigned to the general-purpose key A 306 and the general-purpose key B 308 can be switched.

In order to realize the above processing, the CPU 356 includes an operation information acquiring section 356a that reads out key states, an attachment state acquiring section 356b that acquires the left and right attachment states of the mount sections 310 and 330, and a key state switching section 356c for the key states of the general-purpose key A 306 and the general-purpose key B 308 in accordance with left and right connection states. In this connection, the respective configuration components of the CPU 356 may be configured by the CPU 356 and a program (software) for making this function. In this case, such a program can be stored in the ROM 352.

Moreover, the switching of the general-purpose key A 306 and the general-purpose key B 308 in accordance with the left and right connection states may be performed on the main body section 100 side. In this case, the processing in Step S105 is unnecessary, and upon receipt of all the key states and the left and right connection states sent in Step S108, the main body section 100 performs a process of interchanging the depressed states of the key 366f and the key 366g corresponding to the general-purpose key A 306 and the general-purpose key B 308 respectively in accordance with the left and right connection states. With this, the switching of the states of the general-purpose key A 306 and the general-purpose key B 308 can be performed on the main body section 100 side in accordance with the left and right connection states.

In this connection, in Step S106, in the case where the switching of the general-purpose key A 306 and the general-purpose key B 308 has been performed on the cross key section 300 side in accordance with the left and right connection states, the left and right connection states may not be transmitted in Step S106.

[4. Block Configuration Example of Grip Section]

Figure 10:
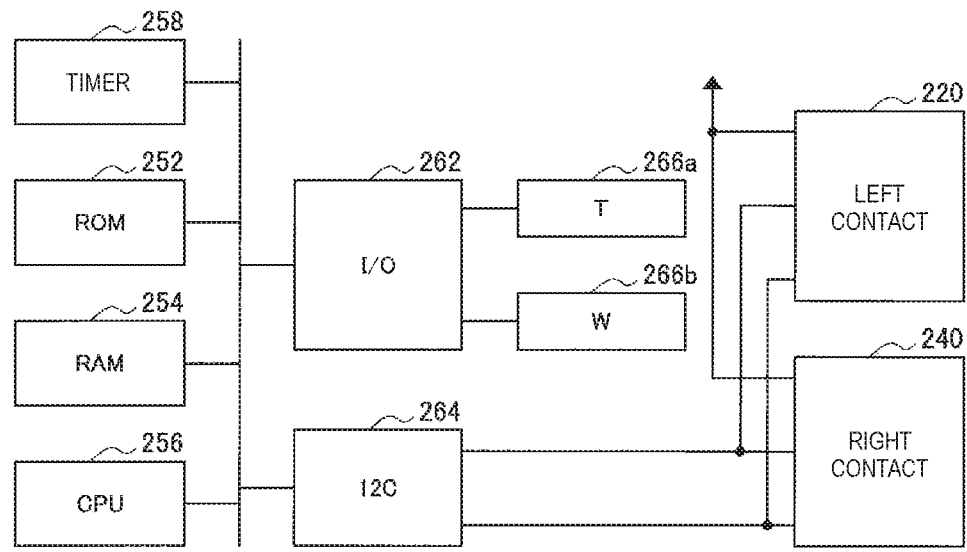
FIG. 10 is a schematic diagram showing a block configuration example of a grip section.

FIG. 10 is a schematic diagram showing a block configuration example of the grip section 200. As shown in FIG. 10, the grip section 200 includes a ROM 252, a RAM 254, a CPU 256, a timer 258, a I/O controller 262, an I2C 264, keys 266a and 266b, a left contact 220, and a right contact 240.

The CPU 256 is a processing unit that stores a program code in the ROM 252, stores data required for processing in the RAM 254, and operates. To the CPU 256, connected are, as peripheral devices, a timer 258 to generate timing for periodic processing, an I2C 264 to perform communication with the cross key section 300, an I/O controller 262 to control the connection ports of the keys 266a and 266b, the keys 266a and 266b to realize the operation of a user, and a left contact 220 and a right contact 240 to electrically connect with the cross key section 300.

The keys 266a and 266b are switches the states of which are switched correspondingly to operation for "T" and "W" by the switch (rocker switch) 250.

Figure 11:
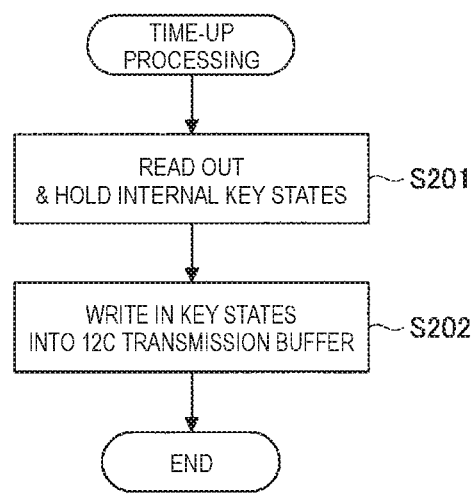
FIG. 11 is a flow chart showing time-up processing in a grip section.

FIG. 11 is a flowchart showing the time-up processing of the grip section 200. The CPU 256 sets a prescribed time interval for the timer 258, and, upon receipt of the matter that the time has elapsed, executes the time-up processing shown in FIG. 11.

First, upon starting the time-up processing, the CPU 256 reads out and holds the states of the internal keys 266a to 266b (Step S201). Next, the states of the keys 266a and 266b are written in a transmission buffer of the I2C 264 (Step S202).

The states of the keys 266a and 266b written in the buffer are read out by the CPU 356 of the cross key section 300 in Step S104 shown in FIG. 9.

[5. Block Configuration Example of Display Section]

Figure 12:
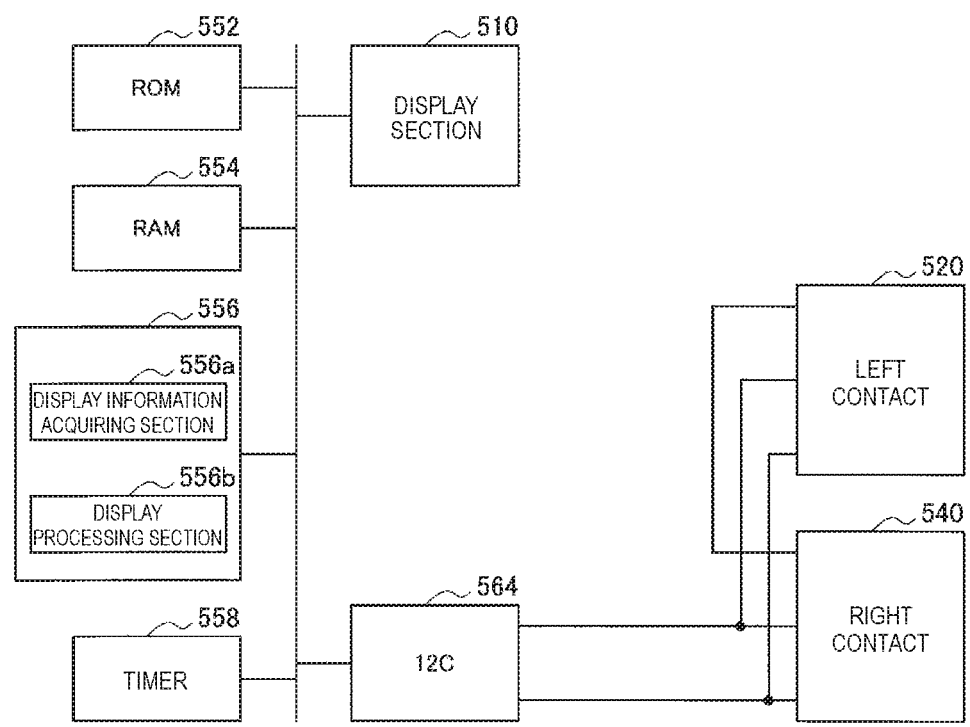
FIG. 12 is a schematic diagram showing a block configuration example of a display device.

FIG. 12 is a schematic diagram showing a block configuration example of the display device 500. As shown in FIG. 12, the display device 500 includes a ROM 552, a RAM 554, a CPU 556, a timer 558, a display section 510, an I2C 564, a left contact 520, and a right contact 540.

The CPU 556 is a processing unit that stores a program code in the ROM 552, stores data required for processing in the RAM 554, and operates. To the CPU 556, connected are a timer 558 to generate timing for periodic processing, an I2C 564 to perform communication with the cross key section 300, a display section 510, and a left contact 520 and right contact 540 to electrically connect with the cross key section 300 or the grip section 200. The CPU 556 displays the display information received through the I2C 564 on the display section 510.

Figure 13:
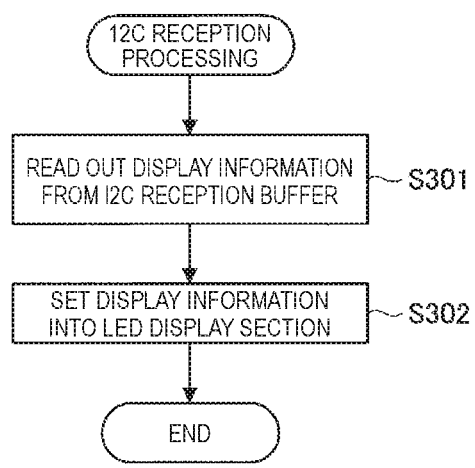
FIG. 13 is a flow chart showing time-up processing in a display device.

FIG. 13 is a flow chart showing time-up processing in the display device 500. The CPU 556 sets a prescribed time interval for the timer 558, and, upon receipt of the matter that the time has elapsed, executes time-up processing shown in FIG. 13.

First, upon starting the time-up processing, the CPU 556 reads out display information from a receiving buffer of the I2C 564 (Step S301). Into this receiving buffer, upon transmission of key states from the cross key section 300, display information corresponding to the key states is written. At this time, the display information corresponding to the key states is changed in accordance with left and right attachment states. Next, on the basis of the display information read out in Step S301, the display information to be displayed on the display section 510 is set up (Step S302). With this, the display information read out from the buffer is displayed on the display section 510.

In order to realize the above processing, the CPU 556 includes a display information acquiring section 556a that reads out display information in accordance with key states, and a display processing section 556b that performs display on the display section 510 in accordance with the display information. In this connection, the respective configuration components of the CPU 556 may be configured by the CPU 356 and a program (software) to make this function. In this case, such a program may be stored in the ROM 552.

Incidentally, in the above-described configuration examples, the grip section 200 and the cross key section 300 are configured in the respective different bodies. However, the grip section 200 and the cross key section 300 may be configured in one body, which may be attached to any one of the right mount section 110 and the left mount section 120 of the main body section 100. Similarly, the grip section 200, the cross key section 300, and the display device 500 may be configured integratedly in one body, which may be attached to any one of the right mount section 110 and the left mount section 120 of the main body section 100.

As described above, according to the present embodiment, in accordance with whether the grip section 200 and the cross key section 300 are attached to either of the left side and right side of the main body section 100, it becomes possible to change the role of an operation key. Furthermore, according to the present embodiment, in accordance with whether the grip section 200 and the cross key section 300 are attached to either of the left side and right side of the main body section 100, it becomes possible to change the display contents of the display section 510. Therefore, in accordance with the attachment state of the grip section 200 and the cross key section 300 to the main body section 100, it becomes possible to optimally control the role of an operation key and the displaying state of a display screen.

Moreover, according to the present embodiment, each of the grip section 200, the cross key section 300, and the display device 500 is equipped with a left mount section and a right mount section, and the left mount section and the right mount section include a male mold mount and a female mold mount, it is possible to reliably suppress erroneous attachment by a photographer.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An adapter device including:

a mount section that is attached to any one of a plurality of main body mount sections included in a main body apparatus; and a user interface a state of which is switched in accordance with whether to which one of the plurality of main body mount sections the mount section has been attached.

(2)

The adapter device according to (1), including:

an attachment information acquiring section that acquires attachment information showing whether to which one of the plurality of main body mount sections the mount section has been attached; and a switching section that switches the state of the user interface on a basis of the attachment information.

(3)

The adapter device according to (2), in which the user interface is an operation input section to which operation information is input by a user, the adapter device includes an operation information acquiring section that acquires the operation information, and the switching section changes the operation information on a basis of the attachment information.

(4)

The adapter device according to (3), including:

a transmitting section that transmits the changed operation information to the main body apparatus.

(5)

The adapter device according to (2), in which the user interface is a display section that displays display information, and the switching section changes the display information on a basis of the attachment information.

(6)

The adapter device according to (1), including:

an attachment information acquiring section that acquires attachment information showing whether to which one of the plurality of main body mount sections the mount section has been attached; and a transmitting section that transmits the attachment information to the main body apparatus in order to switch the state of the user interface on the main body apparatus side.

(7)

The adapter device according to (6), in which the user interface is an operation input section to which operation information is input by a user, the adapter device includes an operation information acquiring section that acquires the operation information, and the transmitting section transmits the operation information together with the attachment information to the main body apparatus in order to switch the state of the user interface on the main body apparatus side.

(8)

The adapter device according to (1), in which the plurality of main body mount sections of the main body apparatus includes a right-hand mount section to which the mount section is attached in a case where the user interface is operated with a right hand, and a left-hand mount section to which the mount section is attached in a case where the user interface is operated with a left hand.

(9)

An imaging apparatus including:

a main body section that includes a plurality of main body mount sections; and an adapter device that includes a mount section that is attached to any one of the plurality of main body mount sections included in the main body section, and a user interface a function of which is switched in accordance with whether to which one of the plurality of main body mount sections the mount section has been attached.

(10)

The imaging apparatus according to (9), in which the adapter device includes an attachment information acquiring section that acquires attachment information showing whether to which one of the plurality of main body mount sections the mount section has been attached, and a switching section that switches a state of the user interface on a basis of the attachment information.

(11)

The imaging apparatus according to (10), in which the user interface is an operation input section to which operation information is input by a user, the adapter device includes an operation information acquiring section that acquires the operation information, and the switching section changes the operation information on a basis of the attachment information.

(12)

The imaging apparatus according to (11), in which the adapter device includes a transmitting section that transmits the changed operation information to the main body apparatus.

(13)

The imaging apparatus according to (10), in which the user interface is a display section that displays display information, and the switching section changes the display information on a basis of the attachment information.

(14)

The imaging apparatus according to (9), in which the adapter device includes an attachment information acquiring section that acquires attachment information showing whether to which one of the plurality of main body mount sections the mount section has been attached, and a transmitting section that transmits the attachment information to the main body section in order to switch a state of the user interface on the main body section side.

(15)

The imaging apparatus according to (14), in which the user interface is an operation input section to which operation information is input by a user, the adapter device includes an operation information acquiring section that acquires the operation information, and the transmitting section transmits the operation information together with the attachment information to the main body apparatus in order to switch the state of the user interface on the main body apparatus side.

(16)

The imaging apparatus according to (9), in which the plurality of main body mount sections includes a right-hand mount section to which the mount section is attached in a case where the user interface is operated with a right hand, and a left-hand mount section to which the mount section is attached in a case where the user interface is operated with a left hand.

(17)

An adapter device that is operated with a right hand or a left hand of a user, including:

a first mount section that is attached to a right-hand mount section included in a main body apparatus and including one of a male mold and a female mold, and that includes the other one of the male mold and the female mold; and a second mount section that is attached to a left-hand mount section included in the main body apparatus and including one of a male mold and a female mold, and that includes the other one of the male mold and the female mold.

(18)

The adapter device according to (17), in which in a state where the first mount section is attached to the main body apparatus, another device is attached to the second mount section.

REFERENCE SIGNS LIST

100 main body section
110 right mount section 120 left mount section
200 grip section
210 left mount section
230 right mount section
300 cross key section
310 left mount section
330 right mount section
306 general-purpose key A
308 general-purpose key B
510 display section

The invention claimed is:

1. An adapter device, comprising:
a user interface;
a mount section attachable to one of a plurality of main body mount sections included in a main body apparatus;
an attachment information acquiring section configured to acquire attachment information that comprises information associated with attachment of the mount section to a main body mount section of the plurality of main body mount sections; and
a switching section configured to change, based on the attachment information, a function associated with the user interface.

2. The adapter device according to claim 1, wherein
the user interface is an operation input section configured to receive operation information, and
the adapter device further includes an operation information acquiring section configured to acquire the operation information via the user interface.

3. The adapter device according to claim 1, further comprises:
a transmitting section configured to transmit the changed function associated with the user interface to the main body apparatus.

4. The adapter device according to claim 1, wherein
the user interface is a display section configured to display display information, and wherein
the switching section is further configured to change the display information based on the attachment information.

5. The adapter device according to claim 1, further comprising
a transmitting section configured to transmit the attachment information to the main body apparatus.

6. The adapter device according to claim 5, wherein
the user interface is an operation input section configured to receive operation information,
the adapter device further includes an operation information acquiring section configured to acquire the operation information from the user interface, and
the transmitting section is further configured to transmit the operation information and the attachment information to the main body apparatus.

7. The adapter device according to claim 1, wherein the plurality of main body mount sections includes
a right-hand mount section, wherein the mount section is attachable to the right-hand mount section based on an operation of the user interface with a right hand, and
a left-hand mount section, wherein the mount section is attachable to the left-hand mount section based on the operation of the user interface with a left hand.

8. An imaging apparatus, comprising:
a main body section that includes a plurality of main body mount sections; and
an adapter device, wherein the adapter device comprises:
a user interface;
a mount section attachable to one of the plurality of main body mount sections;
an attachment information acquiring section configured to acquire attachment information that comprises information associated with attachment of the mount section to a main body mount section of the plurality of main body mount sections; and
a switching section configured to change, based on the attachment information, a function associated with the user interface.

9. The imaging apparatus according to claim 8, wherein
the user interface is an operation input section configured to receive operation information, and
the adapter device further includes an operation information acquiring section configured to acquire the operation information from the user interface.

10. The imaging apparatus according to claim 8, wherein
the adapter device further includes a transmitting section configured to transmit the changed function associated with the user interface to the main body section.

11. The imaging apparatus according to claim 8, wherein
the user interface is a display section configured to display display information, and wherein
the switching section is further configured to change the display information based on the attachment information.

12. The imaging apparatus according to claim 8, wherein the adapter device further includes
a transmitting section configured to transmit the attachment information to the main body section, and wherein
the main body section is configured to change, based on the attachment information, the function associated with the user interface.

13. The imaging apparatus according to claim 12, wherein
the user interface is an operation input section configured to receive operation information, wherein
the adapter device further includes an operation information acquiring section configured to acquire the operation information from the user interface, and
the transmitting section is further configured to transmit the operation information and the attachment information to the main body section, and wherein
the main body section is configured to change, based on the attachment information and the operation information, the function associated with the user interface.

14. The imaging apparatus according to claim 8, wherein the plurality of main body mount sections includes
a right-hand mount section, wherein the mount section is attachable to the right-hand mount section based on an operation of the user interface with a right hand, and
a left-hand mount section, wherein the mount section is attachable to the left-hand mount section based on the operation of the user interface with a left hand.

15. An adapter device, comprising:
a user interface;
a first mount section attachable to a right-hand mount section included in a main body apparatus, wherein the right-hand mount section includes one of a male mold or a female mold, and wherein the first mount section includes the other one of the male mold or the female mold;
a second mount section attachable to a left-hand mount section included in the main body apparatus, wherein the left-hand mount section includes one of a male mold or a female mold, and wherein the second mount section includes the other one of the male mold or the female mold;

an attachment information acquiring section configured to acquire attachment information that comprises information associated with attachment of the first mount section to the right-hand mount section or the second mount section to the left-hand mount section; and a switching section configured to change, based on the attachment information, a function associated with the user interface.

16. The adapter device according to claim 15, wherein another device is attachable to the second mount section based on the attachment of the first mount section to the right-hand mount section.

* * * * *